US005793657A

United States Patent [19]
Nemoto

[11] Patent Number: 5,793,657
[45] Date of Patent: Aug. 11, 1998

[54] RANDOM NUMBER GENERATING APPARATUS AND RANDOM NUMBER GENERATING METHOD IN A MULTIPROCESSOR SYSTEM

[75] Inventor: Ryoji Nemoto, Tokyo, Japan

[73] Assignee: NEC Corporation, Tokyo, Japan

[21] Appl. No.: 630,176

[22] Filed: Apr. 10, 1996

[30] Foreign Application Priority Data

Apr. 11, 1995 [JP] Japan .................................. 7-085529

[51] Int. Cl.$^6$ ............................................ G06F 1/02
[52] U.S. Cl. .................................................. 364/717.01
[58] Field of Search ............................ 364/717; 380/46

[56] References Cited

U.S. PATENT DOCUMENTS 5,258,936  11/1993  Gallup et al. ......................... 364/717
5,327,365   7/1994  Fujisaki et al. ....................... 364/717

OTHER PUBLICATIONS

Fox et al., "Parallel Computing Works", Morgan Kaufman Publishers, Inc., pp. 278–288, 1994.

*Primary Examiner*—Tan V. Mai
*Attorney, Agent, or Firm*—Foley & Lardner

[57] ABSTRACT

An initial value for each processor of a multiprocessor system is set using a specified calculating expression. The system determines a random number calculating expression using a multiplicative congruence method so that random numbers generated from these initial values may make a sequence of random numbers in series, and generates random numbers using the calculating expression. The system permits the adding of a processor in the middle of generation of random numbers by making equal to one another the number of random numbers generated by the existing processors, setting an initial value in each processor on the basis of the total number of already generated random numbers, and generating random numbers according to a sequence of random numbers prior to adding the processor until reaching a specified total number of random numbers to be generated.

18 Claims, 5 Drawing Sheets

INITIAL VALUES

FIG. 7

| PROCESSOR NUMBER | MULTI-PLIER | INITIAL VALUE | NUMBER OF RANDOM NUMBERS TO BE GENERATED | RESULT STORING INTERVAL | GENERATED NUMBER COUNTER |
|---|---|---|---|---|---|
| 1 |  | $X_1$ |  |  |  |
| 2 |  | $X_2$ |  |  |  |
| 3 |  | $X_3$ |  |  |  |
| 4 |  | $X_4$ |  |  |  |

INITIAL VALUE: $X_n = X \cdot \alpha^n \bmod M$ (n = 1, 2, 3, 4),
WHERE $\alpha$, x, AND M ARE INTEGERS, AND $0 \leq X < M$

| PROCESSOR NUMBER | MULTI-PLIER | INITIAL VALUE | NUMBER OF RANDOM NUMBERS TO BE GENERATED | RESULT STORING INTERVAL | GENERATED NUMBER COUNTER |
|---|---|---|---|---|---|
| 1 | $\alpha^4$ | $X_1$ | 99 | 4 | 29 |
| 2 | $\alpha^4$ | $X_2$ | 99 | 4 | 30 |
| 3 | $\alpha^4$ | $X_3$ | 99 | 4 | 31 |
| 4 | $\alpha^4$ | $X_4$ | 99 | 4 | 29 |

FIG. 5

INITIAL VALUES

FIG. 13

| PROCESSOR NUMBER | MULTI-PLIER | INITIAL VALUE | NUMBER OF RANDOM NUMBERS TO BE GENERATED | RESULT STORING INTERVAL | GENERATED NUMBER COUNTER |
|---|---|---|---|---|---|
| 1 | $\alpha^4$ | $X_1$ | 99 | 4 | 32 |
| 2 | $\alpha^4$ | $X_2$ | 99 | 4 | 32 |
| 3 | $\alpha^4$ | $X_3$ | 99 | 4 | 32 |
| 4 | $\alpha^4$ | $X_4$ | 99 | 4 | 32 |

FIG. 14

| PROCESSOR NUMBER | MULTI-PLIER | INITIAL VALUE | NUMBER OF RANDOM NUMBERS TO BE GENERATED | RESULT STORING INTERVAL | GENERATED NUMBER COUNTER |
|---|---|---|---|---|---|
| 1 | $\alpha^4$ | $X_{133}$ | 99 | 4 | 32 |
| 2 | $\alpha^4$ | $X_{134}$ | 99 | 4 | 32 |
| 3 | $\alpha^4$ | $X_{135}$ | 99 | 4 | 32 |
| 4 | $\alpha^4$ | $X_{136}$ | 99 | 4 | 32 |
| 5 | | $X_{137}$ | | | |

INITIAL VALUE: $X_{132+n} = X_{132} \cdot \alpha^n \bmod M$ (n = 1, 2, 3, 4, 5),
WHERE $\alpha$, x, AND M ARE INTEGERS, AND $0 \leq X < M$

FIG. 15

| PROCESSOR NUMBER | MULTI-PLIER | INITIAL VALUE | NUMBER OF RANDOM NUMBERS TO BE GENERATED | RESULT STORING INTERVAL | GENERATED NUMBER COUNTER |
|---|---|---|---|---|---|
| 1 | $\alpha^4$ | $X_{133}$ | 53 | 4 | 32 |
| 2 | $\alpha^4$ | $X_{134}$ | 53 | 4 | 32 |
| 3 | $\alpha^4$ | $X_{135}$ | 53 | 4 | 32 |
| 4 | $\alpha^4$ | $X_{136}$ | 52 | 4 | 32 |
| 5 | | $X_{137}$ | 52 | | |

| PROCESSOR NUMBER | MULTI-PLIER | INITIAL VALUE | NUMBER OF RANDOM NUMBERS TO BE GENERATED | RESULT STORING INTERVAL | GENERATED NUMBER COUNTER |
|---|---|---|---|---|---|
| 1 | $\alpha^5$ | $X_{133}$ | 53 | 4 | 32 |
| 2 | $\alpha^5$ | $X_{134}$ | 53 | 4 | 32 |
| 3 | $\alpha^5$ | $X_{135}$ | 53 | 4 | 32 |
| 4 | $\alpha^5$ | $X_{136}$ | 52 | 4 | 32 |
| 5 | $\alpha^5$ | $X_{137}$ | 52 | | |

FIG. 17

| PROCESSOR NUMBER | MULTI-PLIER | INITIAL VALUE | NUMBER OF RANDOM NUMBERS TO BE GENERATED | RESULT STORING INTERVAL | GENERATED NUMBER COUNTER |
|---|---|---|---|---|---|
| 1 | $\alpha^5$ | $X_{133}$ | 53 | 5 | 32 |
| 2 | $\alpha^5$ | $X_{134}$ | 53 | 5 | 32 |
| 3 | $\alpha^5$ | $X_{135}$ | 53 | 5 | 32 |
| 4 | $\alpha^5$ | $X_{136}$ | 52 | 5 | 32 |
| 5 | $\alpha^5$ | $X_{137}$ | 52 | 5 | |

FIG. 18

| PROCESSOR NUMBER | MULTI-PLIER | INITIAL VALUE | NUMBER OF RANDOM NUMBERS TO BE GENERATED | RESULT STORING INTERVAL | GENERATED NUMBER COUNTER |
|---|---|---|---|---|---|
| 1 | $\alpha^5$ | $X_{133}$ | 53 | 5 | 0 |
| 2 | $\alpha^5$ | $X_{134}$ | 53 | 5 | 0 |
| 3 | $\alpha^5$ | $X_{135}$ | 53 | 5 | 0 |
| 4 | $\alpha^5$ | $X_{136}$ | 52 | 5 | 0 |
| 5 | $\alpha^5$ | $X_{137}$ | 52 | 5 | 0 |

FIG. 8

| PROCESSOR NUMBER | MULTI-PLIER | INITIAL VALUE | NUMBER OF RANDOM NUMBERS TO BE GENERATED | RESULT STORING INTERVAL | GENERATED NUMBER COUNTER |
|---|---|---|---|---|---|
| 1 |  | $X_1$ | 99 |  |  |
| 2 |  | $X_2$ | 99 |  |  |
| 3 |  | $X_3$ | 99 |  |  |
| 4 |  | $X_4$ | 99 |  |  |

FIG. 9

| PROCESSOR NUMBER | MULTI-PLIER | INITIAL VALUE | NUMBER OF RANDOM NUMBERS TO BE GENERATED | RESULT STORING INTERVAL | GENERATED NUMBER COUNTER |
|---|---|---|---|---|---|
| 1 | $\alpha^4$ | $X_1$ | 99 |  |  |
| 2 | $\alpha^4$ | $X_2$ | 99 |  |  |
| 3 | $\alpha^4$ | $X_3$ | 99 |  |  |
| 4 | $\alpha^4$ | $X_4$ | 99 |  |  |

FIG. 10

| PROCESSOR NUMBER | MULTI-PLIER | INITIAL VALUE | NUMBER OF RANDOM NUMBERS TO BE GENERATED | RESULT STORING INTERVAL | GENERATED NUMBER COUNTER |
|---|---|---|---|---|---|
| 1 | $\alpha^4$ | $X_1$ | 99 | 4 |  |
| 2 | $\alpha^4$ | $X_2$ | 99 | 4 |  |
| 3 | $\alpha^4$ | $X_3$ | 99 | 4 |  |
| 4 | $\alpha^4$ | $X_4$ | 99 | 4 |  |

FIG. 11

| PROCESSOR NUMBER | MULTI-PLIER | INITIAL VALUE | NUMBER OF RANDOM NUMBERS TO BE GENERATED | RESULT STORING INTERVAL | GENERATED NUMBER COUNTER |
|---|---|---|---|---|---|
| 1 | $\alpha^4$ | $X_1$ | 99 | 4 | 0 |
| 2 | $\alpha^4$ | $X_2$ | 99 | 4 | 0 |
| 3 | $\alpha^4$ | $X_3$ | 99 | 4 | 0 |
| 4 | $\alpha^4$ | $X_4$ | 99 | 4 | 0 |

RANDOM NUMBER GENERATING APPARATUS AND RANDOM NUMBER GENERATING METHOD IN A MULTIPROCESSOR SYSTEM

BACKGROUND OF THE INVENTION

1. Field of the invention

The present invention relates to a random number generating apparatus and a random number generating method in a multiprocessor system for making each of processor of the multiprocessor system generate random numbers.

2. Description of the Related Art

A congruence method, which is one type of random number generating method, is a method of finding a sequence of random numbers $\{X_i\}$ periodically repeated by means of a recurrence formula using a congruence expression $X_{i+1}=aX_i+c$ (mod m), namely, by means of a recurrence formula for performing an integer operation of setting as $X_{i+1}$ a remainder left when a number which is obtained by adding a number c to a number obtained by multiplying $X_i$ by a constant a is divided by a number m.

In case that c=0 in this recurrence formula, since the right side of the recurrence formula $X_i+1=aX_i$ (mod m)

has only a multiplicative operation, a congruence method in this case is particularly called a multiplicative congruence method, and on the other hand, a congruence method in case of c≠0 is called a mixed congruence method.

A method for generating random numbers in parallel on the basis of such an algorithm as a congruence method in a multiprocessor system is disclosed in "Geoffrey C. Fox et.al, Parallel Computing Works!, Morgan Kaufmann Publishers, Inc., 1994, pp.278–288".

In case of generating random numbers in a general-purpose multiprocessor system, a program for generating random numbers, a general-purpose program using the generated random numbers, and other programs having no relation to these programs share the processors composing the multiprocessor system. In such a case as this, the number of processors which can be utilized by the program for generating random numbers dynamically changes. The method of Fox et.al does not suggest that the number of processors for generating random numbers after starting to generate random numbers may be changed, and so it has a problem that random numbers cannot be efficiently generated in such a general-purpose multiprocessor system.

SUMMARY AND OBJECTS OF THE INVENTION

An object of the invention is to make it possible to easily generate random numbers in a multiprocessor system.

Another object of the invention is to make it possible to change the number of processors for generating random numbers during generation of random numbers.

Still another object of the invention is to make it possible for a random number generating program to efficiently generate random numbers as coexisting with various programs running on a multiprocessor system.

In a random number generating apparatus in a first multiprocessor system of the invention;

a processor managing means sets in advance initial values for generating random numbers in plural processors contained in said multiprocessor system, and makes a control so that random numbers generated by the processors on the basis of said initial values may make a sequence of random numbers.

In a random number generating apparatus in a second multiprocessor system of the invention, in a random number generating apparatus in the first multiprocessor system;

said processor managing means adds a random number generating processor to the apparatus during generation of random numbers by said plural processors, resets said initial values for generating random numbers in the respective processors including the added processor, and makes a control so that random numbers generated by said respective processors on the basis of the reset initial values may make a sequence of random numbers.

In a random number generating apparatus in a third multiprocessor system of the invention;

a processor managing means sets in advance initial values for generating random numbers and the number of random numbers to be generated in plural processors contained in said multiprocessor system, and makes a control so that said number of random numbers generated by the respective processors on the basis of said initial values may make a sequence of random numbers.

In a random number generating apparatus in a fourth multiprocessor system of the invention, in a random number generating apparatus in the third multiprocessor system;

said processor managing means adds a random number generating processor to the apparatus during generation of random numbers by said plural processors, resets said initial values for generating random numbers and said number of random numbers to be generated in the processors including the added processor, and makes a control so that the reset number of random numbers generated by said respective processors on the basis of the reset initial values may make a sequence of random numbers.

In a random number generating apparatus in a fifth multiprocessor system of the invention;

a generated random number sequence storing means stores random numbers generated by said plural processors contained in said multiprocessor system, a processor managing means sets initial values for generating random numbers in said plural processors and stores them in said generated random number sequence storing means so that said initial values may make a sequence of random numbers, next, the processor managing means sets the number of random numbers to be generated by each processor on the basis of the total number of random numbers to be generated in the whole multiprocessor system and the number of processors for generating random numbers, and the processor managing means makes a control so that said number of random numbers generated by the respective processors on the basis of said initial values may make a sequence of random numbers, and stores the generated random numbers after said initial numbers stored in said generated random number sequence storing means.

In a random number generating apparatus in a sixth multiprocessor system of the invention, in a random number generating apparatus in the fifth multiprocessor system;

said processor managing adds a random number generating processor during generation of random numbers by said plural processors, resets the initial values for generating random numbers in the respective processors including the added processor, and stores said initial values in said generated random number sequence storing means so as to make a sequence of random numbers, said processor managing means sets the number of random numbers to be generated by each processor on the basis of the total number of random numbers to be generated in the whole multiprocessor system and the number of processors for generating random numbers, and said processor managing means makes a control so that the reset number of random numbers generated by the respective processors on the basis of said reset initial values may make a sequence of random numbers, and stores the generated random numbers after said initial numbers stored in said generated random number sequence storing means.

In a random number generating apparatus in a seventh multiprocessor system of the invention, in a random number generating apparatus in the fifth multiprocessor system;

in case of adding a random number generating processor during generation of random numbers by said plural processors, said processor managing means controls every existing processor so as to generate random numbers up to the number obtained by adding an arbitrary number to the number of random numbers generated by a processor which has generated random numbers most greatly in number among the existing processors, said processor managing means resets an initial value for each processor to generate random numbers on the basis of the number of random numbers already generated by every existing processor, and stores said initial values in said generated random number sequence storing means so as to make a sequence of random numbers, said processor managing means sets the number of random numbers to be generated by each processor on the basis of the total number of random numbers to be generated in the whole multiprocessor system, the number of already generated random numbers, and the number of processors for generating random numbers, and said processor managing means makes a control so that the reset number of random numbers generated by the respective processors on the basis of said reset initial values and the number of already generated random numbers may make a sequence of random numbers, and stores the generated random numbers after said initial values stored in said generated random number sequence storing means.

In a random number generating apparatus in an eighth multiprocessor system of the invention;

a generated random number sequence storing means stores random numbers generated by plural processors contained in said multiprocessor system, a processor managing means sets initial values for generating random numbers in said plural processors by means of an expression $$X_n = X * a^n \bmod M,$$

where a, X, and M are integers, $0 \leq X < M$, and n is a processor number, and stores said initial numbers in said generated random number sequence storing means so as to make a sequence of random numbers, next, the processor managing means sets the number of random numbers to be generated by each processor on the basis of the total number of random numbers to be generated in the whole multiprocessor system and the number of processors for generating random numbers, by means of an expression the number of random numbers to be generated = (the total number of random numbers to be generated/the number of processors)−1, and the processor managing means makes a control so that said number of random numbers generated by the respective processors on the basis of said initial values may make a sequence of random numbers, by means of an expression $$X_{n+rt} = a^r * X_{n+r(t-1)},$$

where X is an integer, a is an initial value, r is the number of processors, n is a processor number, t is a natural number, and $1 \leq t \leq$ the number of generated random numbers, and stores the generated random numbers after said initial values stored in said generated random number sequence storing means.

In a random number generating apparatus in a ninth multiprocessor system of the invention, in a random number generating apparatus in the eighth multiprocessor system;

in case of adding a random number generating processor during generation of random numbers by said plural processors, said processor managing means controls every existing processor so as to generate random numbers up to the number obtained by adding an arbitrary number to the number of random numbers generated by a processor which has generated random numbers most greatly in number among the existing processors, said processor managing means resets an initial value for each processor to generate random numbers on the basis of the number of random numbers already generated by every existing processor, by means of an expression $$X_{q+n} = X_q * a^n \bmod M,$$

where a, X, and M are integers, $0 \leq X \leq M$, n is a processor number, and q is the total number of random numbers generated by all the existing processors, and stores said initial values in said generated random number sequence storing means so as to make a sequence of random numbers, said processor managing means sets the number of random numbers to be generated by each processor on the basis of the total number of random numbers to be generated in the whole multiprocessor system, the number of already generated random numbers, and the number of processors for generating random numbers, by means of an expression the number of random numbers to be generated ={(the total number of random numbers to be generated—the number of already generated random numbers)/the number of processors}−1, and said processor managing means makes a control so that the reset number of random numbers generated by the respective processors on the basis of said reset initial values and the number of already generated random numbers may make a sequence of random numbers, by means of an expression $$X_{n+q+rt} = a^r * X_{n+q+r(t-1)},$$

where X is an integer, a is an initial value, r is the number of processors, n is a processor number, q is the total number of random numbers generated by all the existing processors, t is a natural number, and $1 \leq t \leq$ the number of generated random numbers, and stores the generated random numbers after said initial values stored in said generated random number sequence storing means.

A random number generating method in a first multiprocessor system of the invention, comprises;

a process of setting in advance initial values for generating random numbers in plural processors contained in said multiprocessor system, and making a control so that random numbers generated by the respective processors on the basis of said initial values may make a sequence of random numbers.

A random number generating method in a second multiprocessor system of the invention, in a random number generating method in the first multiprocessor system, comprises;

a process of adding a random number generating processor during generation of random numbers by said plural processors, resetting said initial values for generating random numbers in the respective processors including the added processor, and making a control so that random numbers generated by the respective processors on the basis of the reset initial values may make a sequence of random numbers.

A random number generating method in a third multiprocessor system of the invention, comprises;

a process of setting in advance initial values for generating random numbers and the number of random numbers to be generated in plural processors contained in said multiprocessor system, and making a control so that said number of random numbers generated by the respective processors on the basis of said initial values may make a sequence of random numbers.

A random number generating method in a fourth multiprocessor system of the invention, in a random number generating method in the third multiprocessor system, comprises;

a process of adding a random number generating processor during generation of random numbers by said plural processors, resetting said initial values for generating random numbers and said number of random numbers to be generated in the respective processors including the added processor, and making a control so that the reset number of random numbers generated by the respective processors on the basis of the reset initial values may make a sequence of random numbers.

A random number generating method in a fifth multiprocessor system, comprises;

a process of setting initial values for generating random numbers in plural processors contained in said multiprocessor system and storing said initial values in a storage unit so as to make a sequence of random numbers, a process of setting the number of random numbers to be generated by each of the processors on the basis of the total number of random numbers generated in the whole multiprocessor system and the number of processors, and a process of making a control so that said number of random numbers generated by the respective processors on the basis of said initial values may make a sequence of random numbers, and storing the generated random numbers after said initial values stored in said storage unit.

A random number generating method in a sixth multiprocessor system of the invention, in a random number generating method in the fifth multiprocessor system, comprises;

a process of adding a random number generating processor during generation of random numbers by said plural processors, resetting initial values for generating random numbers in the respective processors including the added processor, and storing said initial values in said storage unit so as to make a sequence of random numbers, a process of setting the number of random numbers to be generated by each of the processors on the basis of the total number of random numbers generated in the whole multiprocessor system and the number of processors, and a process of making a control so that the reset number of random numbers generated by the respective processors on the basis of said reset initial values may make a sequence of random numbers, and storing the generated random numbers after said initial values stored in said storage unit.

A random number generating method in a seventh multiprocessor system of the invention, in a random number generating method in the fifth multiprocessor system, comprises;

in case of adding a random number generating processor during generation of random numbers by said plural processors, a process of controlling every existing processor so as to generate random numbers up to the number obtained by adding an arbitrary number to the number of random numbers generated by a processor which has generated random numbers most greatly in number among the existing processors, a process of resetting initial values for the respective processors to generate random numbers on the basis of the number of random numbers already generated by every existing processor and storing said initial values in said storage unit so as to make a sequence of random numbers, a process of setting the number of random numbers by each of the processors on the basis of the total number of random numbers generated in the whole multiprocessor system, the number of already generated random numbers, and the number of processors for generating random numbers, and a process of making a control so that the reset number of random numbers generated by the respective processors on the basis of said reset initial values and the number of already generated random numbers may make a sequence of random numbers, and storing the generated random numbers after said initial values stored in said storage unit.

A random number generating method in an eighth multiprocessor system of the invention, comprises;

a process of setting initial values for generating random numbers in plural processors contained in said multiprocessor system by means of an expression $$X_n = X * a^n \bmod M,$$

where a, X, and M are integers, $0 \leq X \leq M$, and n is a processor number, and storing said initial numbers in a storage unit so as to make a sequence of random numbers, a process of setting the number of random numbers to be generated by each of the processors on the basis of the total number of random numbers to be generated in the whole multiprocessor system and the number of processors for generating random numbers, by means of an expression the number of random numbers to be generated=(the total number of random numbers to be generated/the number of processors)−1, and a process of making a control so that said number of random numbers generated by the respective processors on the basis of said initial values may make a sequence of random numbers by means of an expression $$X_{m+rt} = a^{t*} X_{m+r(t-1)},$$

where X is an integer, a is an initial value, r is the number of processors, n is a processor number, t is a natural number, and $1 \leq t \leq$ the number of generated random numbers, and storing the generated random numbers after said initial values stored in said storage unit.

A random number generating method in a ninth multiprocessor system of the invention, in a random number generating method in the eighth multiprocessor system, comprises;

in case of adding a random number generating processor during generation of random numbers by said plural processors, a process of controlling every existing processor so as to generate random numbers up to the number obtained by adding an arbitrary number to the number of random numbers generated by a processor which has generated random numbers most greatly in number among the existing processors, a process of resetting initial values for the respective processors to generate random numbers on the basis of the number of random numbers already generated by every existing processor, by means of an expression $$X_{q+n}=X_q*a^n \bmod M,$$

where a, X, and M are integers, $0 \leq X \leq M$, n is a processor number, and q is the total number of random numbers generated by all the existing processors, and storing said initial values in said storage unit so as to make a sequence of random numbers, a process of setting the number of random numbers to be generated by each processor on the basis of the total number of random numbers to be generated in the whole multiprocessor system, the number of already generated random numbers, and the number of processors for generating random numbers, by means of an expression the number of random numbers to be generated ={(the total number of random numbers to be generated—the number of already generated random numbers)/the number of processors}−1, and a process of making a control so that the reset number of random numbers generated by the respective processors on the basis of said reset initial values and the number of already generated random numbers may make a sequence of random numbers, by means of an expression $$X_{n+q+rt}=a^r*X_{n+q+r(t-1)},$$

where X is an integer, a is an initial value, r is the number of processors, n is a processor number, q is the total number of random numbers generated by all the existing processors, t is a natural number, and $1 \leq t \leq$ the number of generated random numbers, and storing the generated random numbers after said initial values stored in said storage unit.

BRIEF DESCRIPTION OF THE DRAWINGS

The invention will be understood more fully from the detailed description given here below and from the accompanying drawings of preferred embodiments of the invention, which, however, should not be considered as limiting the invention but are for explanation and understanding only.

Here, it should be noted that like reference numerals represent like elements throughout the disclosure.

DETAILED DESCRIPTION OF THE PREFERRED EMBODIMENTS

Preferred embodiments of the invention are described in the following, as referring to the drawings.

Figure 1:
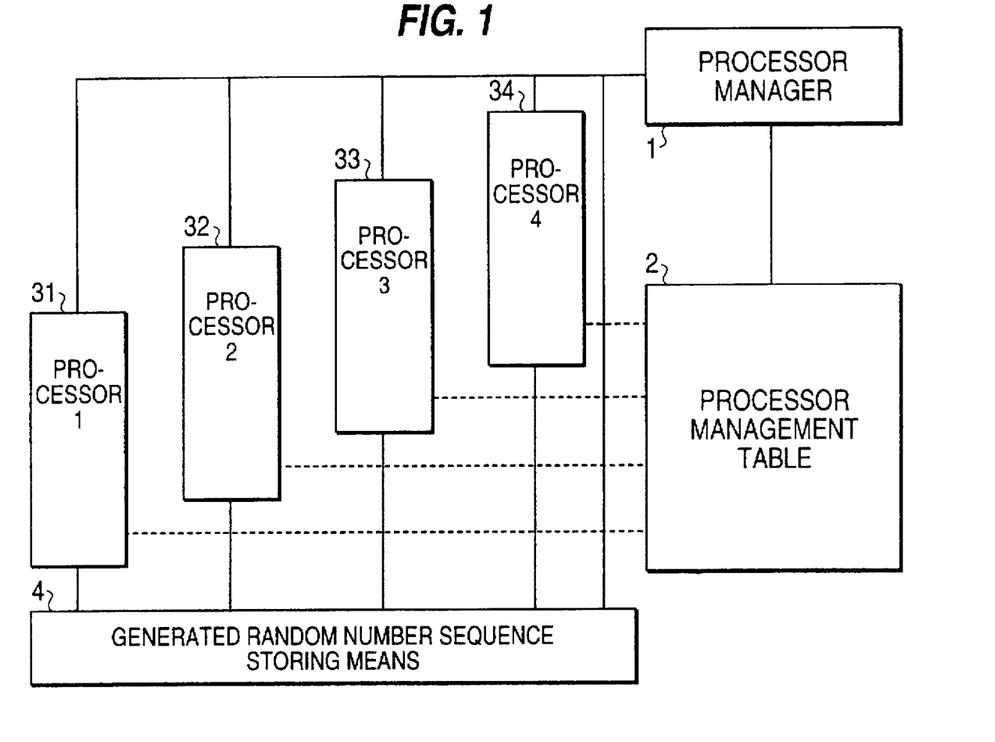
FIG. 1 is a block diagram of a first embodiment of the invention.

Referring to FIG. 1, a random number generating apparatus in a multiprocessor system which is a first embodiment of the invention is composed of processors 31, 32, 33, and 34 for generating random numbers, a processor managing means 1 for setting an initial value and parameters for each of the processors to generate random numbers, a processor management table 2 for having parameters stored in it for each of the processors to generate random numbers, and a generated random number sequence storing means 4 for storing random numbers generated by each processor.

A random number generating apparatus in a multiprocessor system which is a first embodiment of the invention is described in detail in the following, as referring to FIGS. 1 to 3 and FIGS. 7 to 11.

In this embodiment, it is assumed that each of the processors generates 400 random numbers on the basis of its initial value.

First, the processor managing means 1 sets an initial value for each of the processors 31 to 34 on the basis of the following expression $$X_n=X*a^n \bmod M,$$

(where a, X, and M are integers, $0 \leq X \leq M$, and n is a processor number).

Therefore, the initial value of each processor is as follows.

For the processor 31, $X_1=X*a \bmod M$,
for the processor 32, $X_2=X*a^2 \bmod M$,
for the processor 33, $X_3=X*a^3 \bmod M$, and
for the processor 34, $X_4=X*a^4 \bmod M$.

Figure 2:
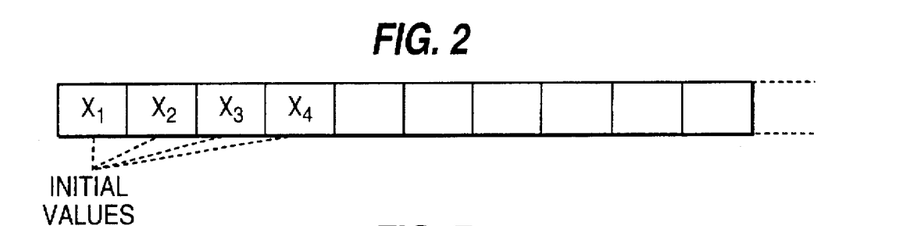
FIG. 2 is a figure for showing a state in which initial values have been stored in a generated random number sequence storing means 4 in the first embodiment of the invention.

The processor managing means 1 stores these initial values in the generated random number sequence storing means 4, as shown in FIG. 2.

Figure 7:
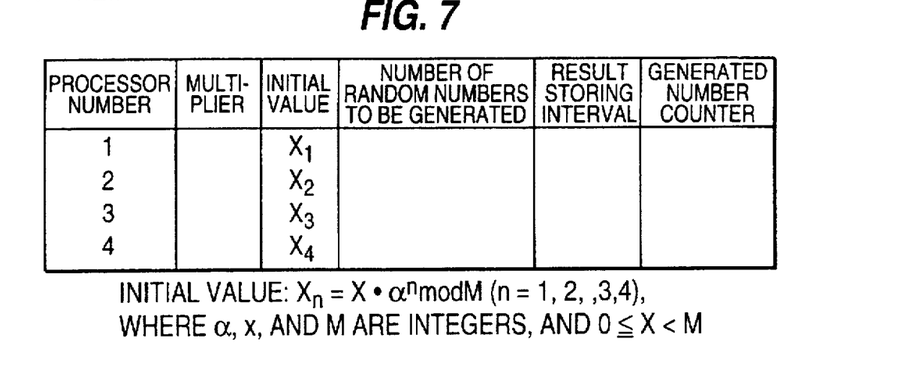
FIGS. 7 to 11 are figures for showing contents of a processor management table 2 in the first embodiment of the invention.

The processor managing means 1 stores these initial values also in the processor management table 2, as shown in FIG. 7.

Next, the processor managing means 1 sets the number of random numbers to be generated by each processor on the basis of the following expression the number of random numbers to be generated=(the total number of random numbers to be generated/the number of processors)−1.

Therefore, the number of random numbers to be generated=(400/4) −1=99.

Figure 8:
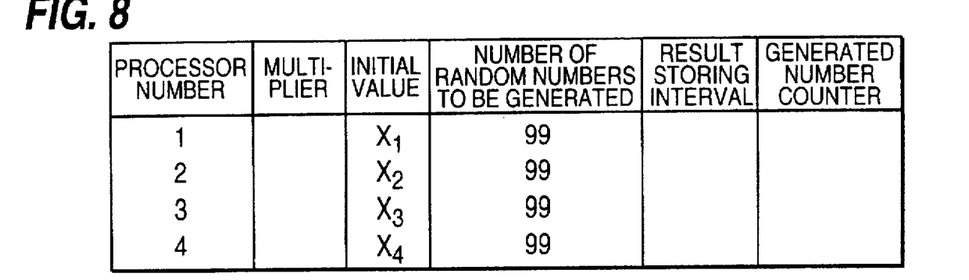

The processor managing means 1 stores this number of random numbers to be generated in the column of the number of random numbers to be generated in the processor management table 2, as shown in FIG. 8. In case that a remainder is left in division in said calculation, 1 taken from the remainder is added to the number of random numbers to be generated by one of the processors one by one in an ascending order of the processor numbers.

Figure 9:
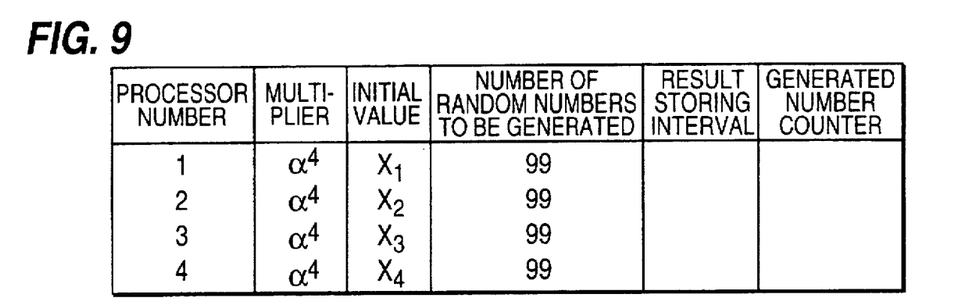

Next, the processor managing means 1 determines a multiplier of the multiplicative congruence method for each processor to use in generating random numbers by means of the following expression multiplier=$a  r (=a^r)$, (where a is an initial value,  is a symbol of power operation, and r is the number of processors), and stores the multipliers in the multiplier column of the processor management table 2, as shown in FIG. 9.

In this embodiment, therefore, multiplier=$a^4$.

Figure 10:
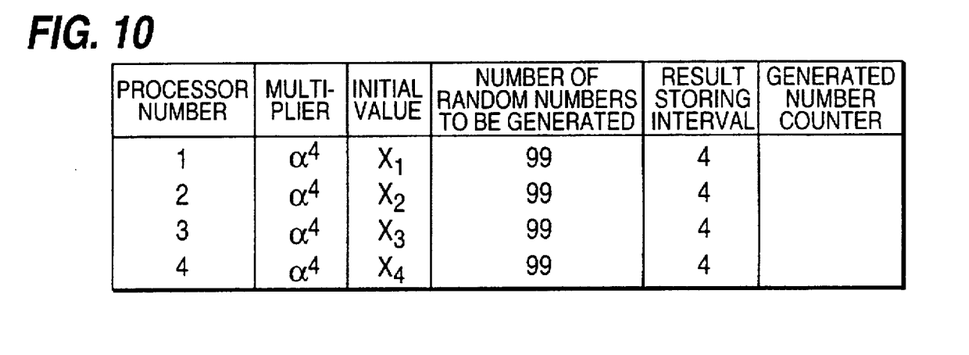

The processor managing means 1 stores the result storing intervals, at which random numbers generated by each processor are in series stored in the generated random number sequence storing means 4, in the column of result storing intervals in the processor management table 2, as shown in FIG. 10.

In this embodiment, the result storing interval is 4 since the number of processors is 4.

The processor managing means 1 stores 0 in a generated number counter of each processor in the processor management table 2.

Next, the processor managing means 1 instructs each processor to start generating random numbers.

Figure 3:
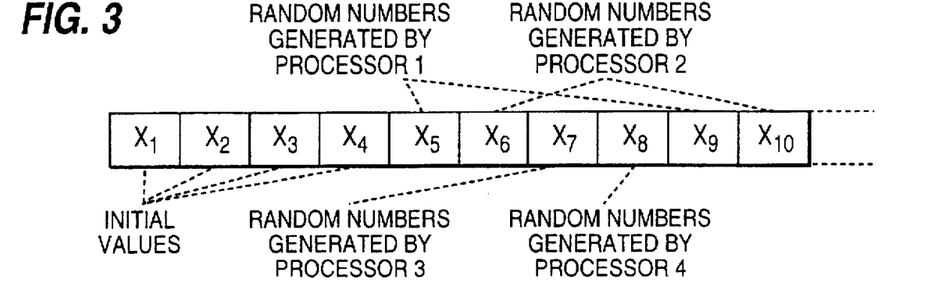
FIG. 3 is a figure for showing a state in which random numbers generated by each processor are stored in a generated random number sequence storing means 4 in the first embodiment of the invention.
Figure 11:
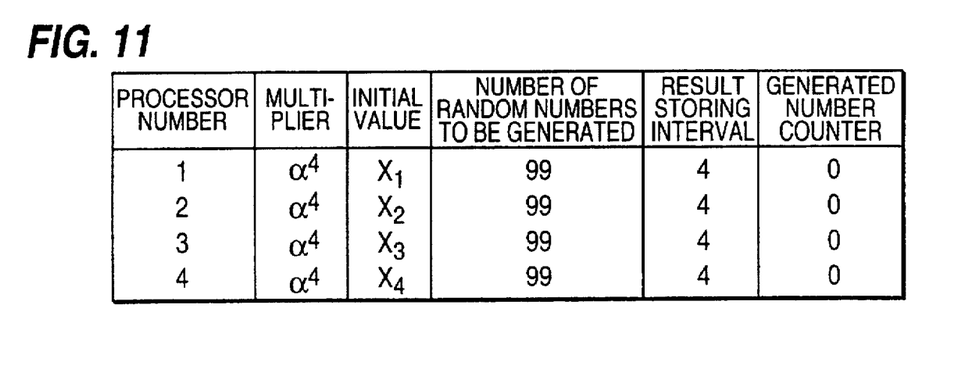

When each processor is instructed to start generation of random numbers by the processor managing means 1, each processor takes a multiplier, an initial number, and the number of random numbers to be generated corresponding to its own processor number from the processor management table 2 which is in a state shown in FIG. 11, and generates random numbers by performing an operation by means of the following expression. Furthermore, each processor stores random numbers which it has generated in the generated random number sequence storing means 4 at the result storing intervals as shown in FIG. 3, and adds 1 to a value of the generated number counter corresponding to its own processor number in the processor management table 2.

In an expression $X_{n+rt} = a^{r*} X_{n+r(t-1)}$, (where a and X are integers, and n is a processor number), supposing r=4 and t is a natural number beginning at 1, the processor 31 generates random numbers $X_{1+4} = a^4 * X_1, X_{1+4*2} = a^4 * X_{1+4}, \dots$, the processor 32 generates random numbers $X_{2+4} = a^4 * X_2, X_{2+4*2} = a^4 * X_{2+4}, \dots$, the processor 33 generates random numbers $X_{3+4} = a^4 * X_3, X_{3+4*2} = a^4 * X_{3+4}, \dots$, the processor 34 generates random numbers $X_{4+4} = a^4 * X_4, X_{4+4*2} = a^4 * X_{4+4}, \dots$, Each processor repeats the computation of random numbers by the number of times indicated by the number of random numbers to be generated in the processor management table 2.

In this manner, a process of the random number generating apparatus in a multiprocessor system of the first embodiment of the invention is completed.

The random number generating apparatus in a multiprocessor system of the first embodiment of the invention is characterized by that the processor managing means 1 sets an initial value and parameters for each processor to generate random numbers and stores them in the processor management table 2, and each processor generates random numbers on the basis of the initial value and the parameters stored in the processor management table 2 for generating random numbers, by means of a multiplicative congruence method.

The random number generating apparatus in a multiprocessor system of the first embodiment of the invention has an effect of making it possible to efficiently and easily generate random numbers in a multiprocessor system thanks to such a feature as this.

Figure 4:
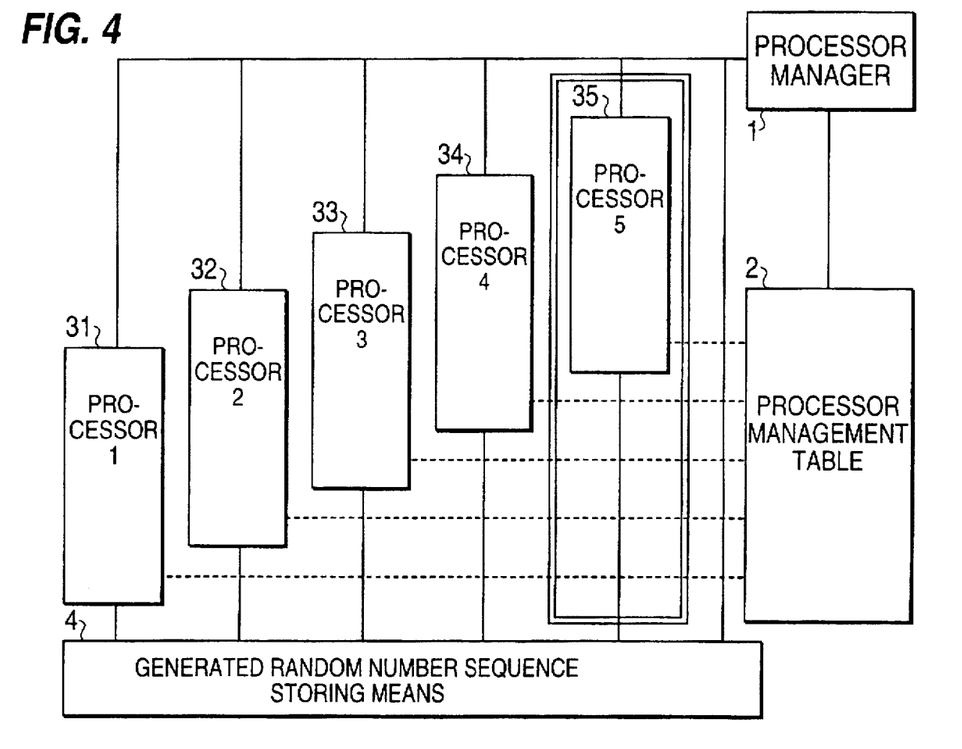
FIG. 4 is a block diagram of a second embodiment of the invention.

Referring to FIG. 4, a random number generating apparatus in a multiprocessor system which is a second embodiment of the invention has a processor 35 for generating random numbers in addition to the random number generating apparatus in a multiprocessor system which is the first embodiment.

The random number generating apparatus in a multiprocessor system which is the second embodiment of the invention is described in detail in the following, as referring to FIGS. 4 to 6 and FIGS. 12 to 18.

Figure 12:
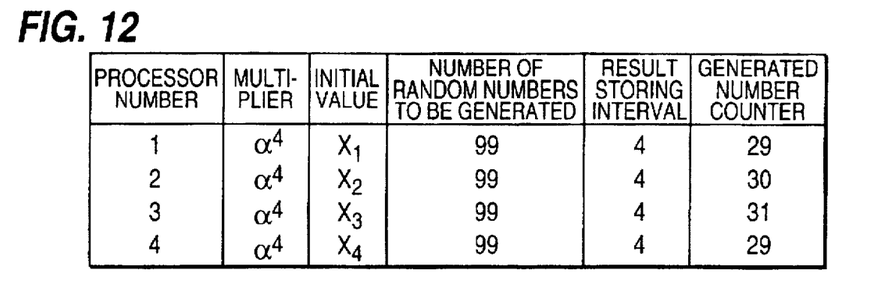
FIGS. 12 to 18 are figures for showing contents of a processor management table 2 in the second embodiment of the invention.

In this embodiment, a case that the processor 35 is added to an environment in which contents of the processor management table 2 are in a state shown in FIG. 12 is described.

The processor managing means 1 recognizes the processor number and the generated number counter of the processor which has the greatest value in its generated number counter, namely, has generated random numbers most greatly in number at the point of time, through referring to the processor management table 2. In this embodiment, a processor number "3" and a value "31" of the generated number counter are recognized.

The processor managing means 1 finds a value obtained by adding a predetermined delay number to the recognized value of the generated number counter (hereinafter referred to as the number of random numbers temporarily stopped to generate), and makes the existing processors 31 to 34 stop a process of generating random numbers at the point of time when values of their generated number counters reach the number of random numbers temporarily stopped to generate. The delay number is the least integer which is greater than the number of random numbers generated from the point of time when the processor managing means 1 has issued an instruction to stop generating random numbers till the point of time when the processors actually stop to generate random numbers. In this embodiment, said delay number is "1", and the number of random numbers temporarily stopped to generate is "32".

Figure 13:
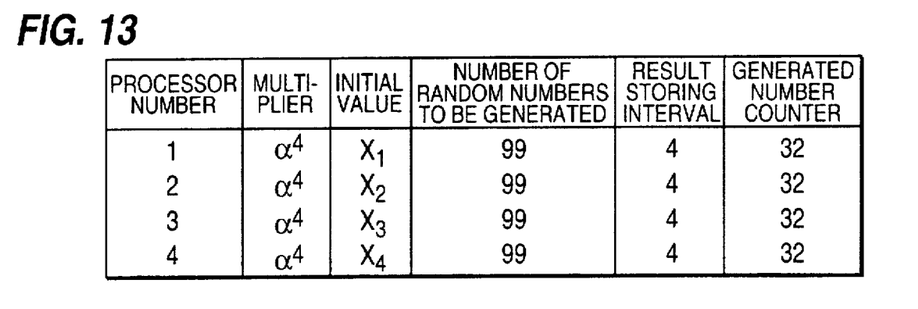

Next, the processor managing means 1 monitors said processor management table 2 until a value of the generated number counter of every processor in the processor management table 2 reaches "32". The processor managing means 1 makes each processor stop generating random numbers when its generated number counter reaches "32". A state of the processor management table 2 at this time is shown in FIG. 13.

At this point of time, the processor managing means 1 changes the contents of the processor management table 2. Namely,

4+(32×4)=132 is obtained as the total number of generated random numbers at this point of time by adding the initial values. And an initial value of each processor after the number of processors has become "5" is set on the basis of the following expression $$X_{132+n} = X_{132} * a^n \bmod M,$$

(where a, X, and M are integers, $0 \leq X \leq M$, and n is a processor number).

Figure 5:
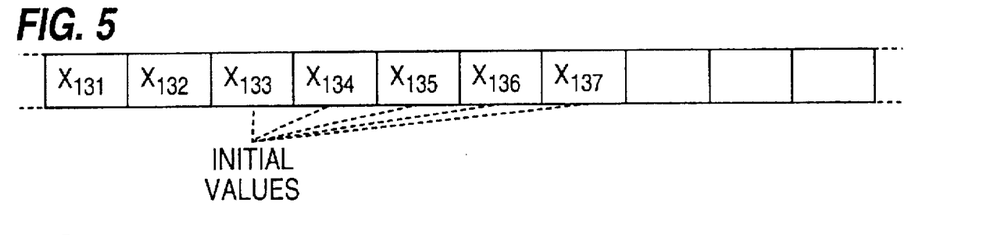
FIG. 5 is a figure for showing a state in which initial values have been stored in a generated random number sequence storing means 4 in the second embodiment of the invention.

The processor managing means 1 stores the set initial values in the generated random number sequence storing means 4, as shown in FIG. 5.

Figure 14:
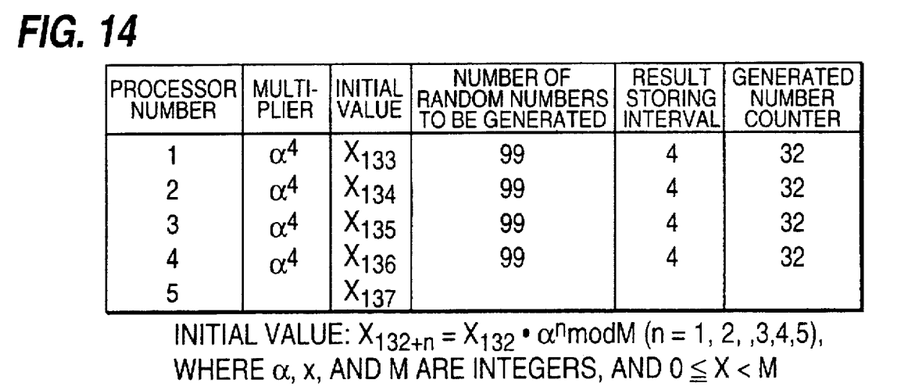

The processor managing means 1 stores these initial values also in the processor management table 2, as shown in FIG. 14.

Next, the processor managing means 1 sets the number of random numbers to be generated after this point of time by each processor on the basis of the total number 400 of random numbers to be generated and the total number 132 of random numbers temporarily stopped to generate, by means of the following expression.

The number of random numbers to be generated ={(the total number of random numbers to be generated—the number of already generated random numbers)/the number of processors}−1.

Therefore, the number of random numbers to be generated={(400−132)/5}−1=52.

In case that a remainder is left in division in said calculation, 1 taken from the remainder is added to the number of random numbers to be generated by one of the processors one by one in an ascending order of the processor numbers.

Figure 15:
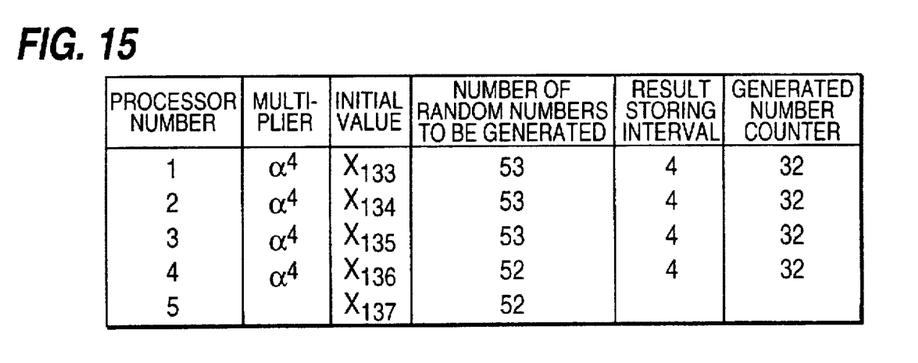

The processor managing means 1 stores this number of random numbers to be generated in the column of the number of random numbers to be generated in the processor management table 2, as shown in FIG. 15.

Next, the processor managing means 1 determines a multiplier of the multiplicative congruence method for each processor to use in generating random numbers by means of the following expression $$\text{multiplier} = a ** r \ (=a^r),$$

Figure 16:
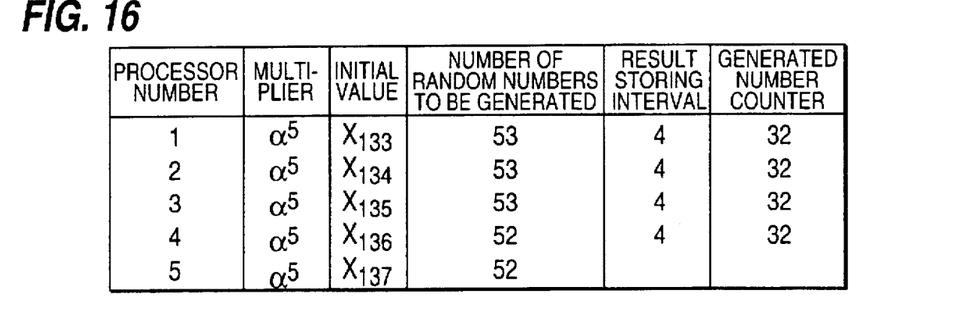

(where a is an initial value, ** is a symbol of power operation, and r is the number of processors), and stores the multiplier in the column of multipliers of the processor management table 2, as shown in FIG. 16.

In this embodiment, therefore, $$\text{multiplier} = a^5.$$

Figure 17:
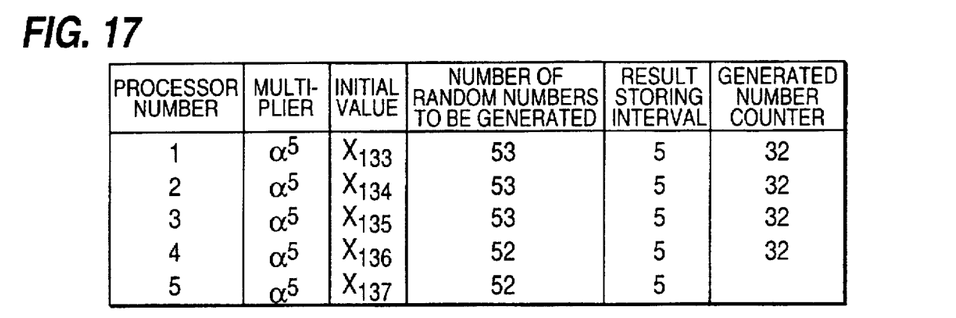

The processor managing means 1 stores the result storing intervals, at which random numbers generated by each processor are in series stored in the generated random number sequence storing means 4, in the column of result storing intervals in the processor management table 2, as shown in FIG. 17.

In this embodiment, the result storing interval is 5 since the number of processors is 5.

Figure 18:
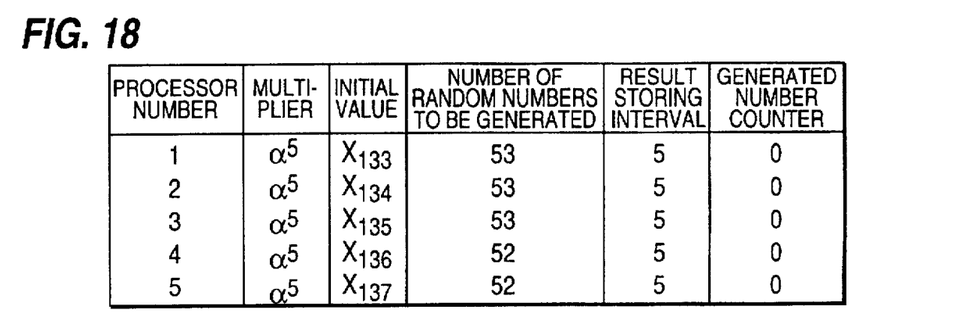

The processor managing means 1 stores 0 in a generated random number counter of each processor in the processor management table 2, as shown in FIG. 18.

Next, the processor managing means 1 instructs each processor to start generating random numbers.

Figure 6:
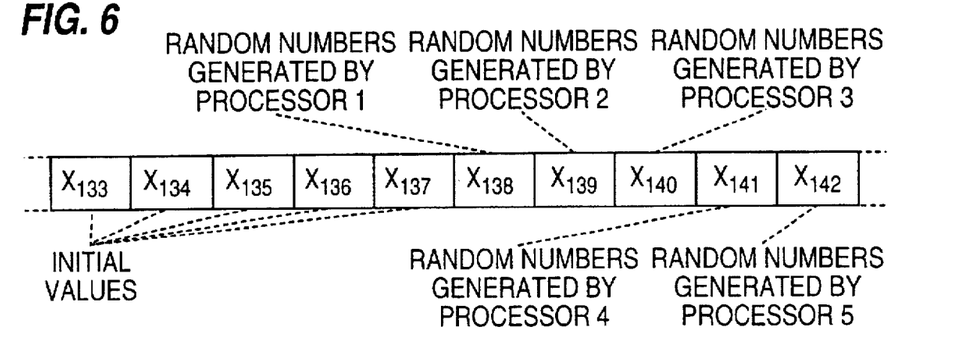
FIG. 6 is a figure for showing a state in which random numbers generated by each processor are stored in a gen-erated random number sequence storing means 4 in the second embodiment of the invention.

When each processor is instructed to start generation of random numbers by the processor managing means 1, each processor generates random numbers as making a computation by means of the following expression according to a multiplier, an initial number, and the number of random numbers to be generated corresponding to its own processor number from the processor management table 2 which is in a state shown in FIG. 18. Furthermore, each processor stores its generated random numbers in the generated random number sequence storing means 4 at the result storing intervals as shown in FIG. 6, and adds 1 to a value of the generated random number counter corresponding to its own processor number in the processor management table 2.

$$X_{n+q+rt} = a^{r*} X_{n+q+r(t-1)},$$

(where a and X are integers, and n is a processor number).

Since r=4, t is a natural number beginning at 1, and q is 132 in this expression, each processor generates random numbers $$X_{n+132+5} = a5 * X_{n+132}, X_{n+132+5*2} = a^5 * X_{n+132+5}, \ldots$$

Each processor repeats the computation of random numbers by the number of times indicated by the number of random numbers to be generated in the processor management table 2.

In this manner, a process of the random number generating apparatus in a multiprocessor system of the second embodiment of the invention is completed.

The random number generating apparatus in a multiprocessor system of the second embodiment of the invention is characterized by that in order to add a new processor in the middle of generating random numbers the processor managing means 1 makes equal to one another the number of random numbers to be generated by the existing processors in relation to parameters stored in the processor management table 2 and sets an initial value based on the total number of random numbers generated by that point of time by all the existing processors and the number of random numbers to be generated after that point of time in every processor after adding the new processor, and makes each processor generate random numbers on the basis of the initial value and the parameters for generating random numbers which are stored in the processor managing table 2, by means of a multiplicative congruence method.

The random number generating apparatus in a multiprocessor system of the second embodiment of the invention has an effect of making it possible to change the number of random number generating processors during generation of random numbers in a multiprocessor system thanks to being provided with such a feature as this.

As described above, since the present invention can change the number of random number generating processors during generation of random numbers in a multiprocessor system, the invention has an effect that it is possible to efficiently generate random numbers as coexisting with various programs running on the multiprocessor system.

Although the invention has been described in detail above in connection with various preferred embodiments thereof, it will be appreciated by those skilled in the art that these embodiments have been provided solely for purposes of illustration, and are in no way to be considered as limiting the invention. Instead, various modifications and substitutions of equivalent techniques will be readily apparent to those skilled in the art upon reading this specification, and such modifications and substitutions are to be considered as falling within the true scope and spirit of the following claims.

What is claimed is:

1. A random number generating apparatus in a multiprocessor system, comprising:

a plurality of processors; and a processor managing means for setting in advance initial values for said processors;

wherein said processors simultaneously generate random numbers on the basis of the initial values; and wherein said processor managing means arranges the random numbers generated by the processors to produce a sequence of periodically repeated random numbers.

2. A random number generating apparatus in a multiprocessor system as defined in claim 1, wherein said processor managing means adds an additional processor for generating random numbers during generation of the random numbers by said plurality of processors, resets said initial values for generating the random numbers in the respective plurality of processors and the additional processor, and arranges the random numbers generated by said respective processors to produce on the basis of the reset initial values the sequence of periodically repeated random numbers.

3. A random number generating apparatus in a multiprocessor system, comprising:

a plurality of processors;

a processor managing means for setting in advance initial values for said processors, said initial values being based in part on a number of random numbers to be generated by said processors;

wherein said processors simultaneously generate random numbers on the basis of the initial values; and wherein said processor managing means arranges said random numbers generated by the respective processors to produce a sequence of periodically repeated random numbers.

4. A random number generating apparatus in a multiprocessor system as defined in claim 3, wherein said processor managing means adds an additional processor for generating random numbers during generation of random numbers by said plurality of processors, resets said initial values for generating the random numbers with the respective Plurality of processors and the additional processor, and arranges the random numbers generated by said respective processors and the additional processor to produce on the basis of the reset initial values the sequence of periodically repeated random numbers.

5. A random number generating apparatus in a multiprocessor system, comprising:

a plurality of processors for generating random numbers;

a storing means;

a processor managing means for setting initial values for said processors and for storing said initial values in said storing means;

wherein the processor managing means sets a number of random numbers to be generated by each processor on the bases of the total number of random numbers to be generated in the whole multiprocessor system and the number of said plurality of processors;

wherein said processors simultaneously generate random numbers on the basis of the initial values stored in said storing means; and wherein the processor managing means arranges said random numbers generated by the respective processors to produce a sequence of periodically repeated random numbers which are stored in said storing means.

6. A random number generating apparatus in a multiprocessor system as defined in claim 5, wherein said processor managing means adds an additional processor for generating random numbers while said plurality of processors are generating random numbers, resets the initial values for generating the random numbers in the respective processors including the additional processor, and stores said initial values in said storing means;

wherein said processor managing means sets the number of random numbers to be generated by each processor on the bases of the total number of random numbers to be generated in the whole multiprocessor system and the number of processors for generating random numbers, and;

wherein said plurality of processors and said additional processor generate random numbers on the basis of said reset initial values; and wherein said processor managing means arranges the random numbers generated by said plurality of processors and said additional processor to generate a sequence of periodically repeated random numbers which are stored in said storing means.

7. A random number generating apparatus in a multiprocessor system as defined in claim 5, wherein an additional random number generating processor is added during generation of the random numbers by said plurality of processors, and said processor managing means controls each of said plurality of processors so as to generate random numbers up to a number obtained by adding an arbitrary number to the number of random numbers generated by one of said plurality of processors which has generated the greatest number of random numbers;

wherein said processor managing means resets an initial value for each of said plurality of processors and said additional processor to generate random numbers on the basis of the number of random numbers already generated by said plurality of processors, and stores said reset initial value for each of said plurality of processors and said additional processor in said storing means;

wherein said processor managing means sets the number of random numbers to be generated by said additional processor and said plurality of processors on the bases of the total number of random numbers to be generated in the whole multiprocessor system, the number of already generated random numbers, and the number of said plurality of processors and said additional processor; and wherein said processor managing means arranges the random numbers generated by the respective processors on the basis of said reset initial values and the number of already generated random numbers to produce a sequence of periodically repeated random numbers which are stored in said storing means.

8. A random number generating apparatus in a multiprocessor system, comprising:

a plurality of processors for generating random numbers;

a storing means;

a processor managing means for setting initial values for said processors and for storing said initial values in said storing means, said initial values being determined by means of an expression:

$$X_n = X * a^n \bmod M,$$

where a, X, and M are integers, $0 \leq X < M$, and n is the number of said plurality of processors;

wherein the processor managing means sets a number of random numbers to be generated by each of said plurality of processors on the bases of the total number of random numbers to be generated in the whole multiprocessor system and the number of said plurality of processors the number of random numbers to be generated being equal to the total number of random numbers to be generated divided by the number of said plurality of processors, minus one;

wherein the processor managing means arranges the random numbers generated by the respective processors on the basis of said initial values to produce a sequence of random numbers which are stored in said storing means, said sequence of random numbers being produced by said processing managing means by means of an expression:

$$X_{n+n}=a^t * X_{n+r(t-1)},$$

where X is an integer, a is an initial value, r is the number of processors, n is a processor number, t is a natural number, and $1 \leq t \leq$ the number of generated random numbers.

9. A random number generating apparatus in a multiprocessor system as defined in claim 8, wherein an additional random number generator processor is added during generation of the random numbers by said plurality of processors, and said processor managing means controls each of said plurality of processors so as to generate random numbers up to a number obtained by adding an arbitrary number to the number of random numbers generated by one of said plurality of processors which has generated the greatest number of random numbers;

wherein said processor managing means resets an initial value for each of said plurality of processors and said additional processor to generate random numbers on the basis of the number of random numbers already generated by said plurality of processors, and stores said reset initial value for each of said plurality of processors and said additional processor in said storing means, said random numbers being generated by means of an expression:

$$X_{q+n}=X_q * a^n \bmod M,$$

where a, X, and M are integers, $0 \leq X < M$, n is a processor number, and q is the total number of random numbers generated by the plurality of processors;

wherein said processor managing means sets the number of random numbers to be generated by each processor on the bases of the total number of random numbers to be generated in the whole multiprocessor system, the number of already generated random numbers, and the number of processors for generating random numbers;

wherein the number of random numbers to be generated equals {(the total number of random numbers to be generated minus the number of already generated random numbers) divided by the number of processors} minus one; and wherein said processor managing means arranges random numbers generated by the respective processors on the basis of said reset initial values and the number of already generated random numbers to produce a sequence of random numbers which are stored in said storing means, said sequence of random numbers being obtained by means of an expression:

$$X_{n+q+r}=a^t * X_{n+q+r(t-1)},$$

where X is an integer, a is an initial value, r is the number of processors, n is a processor number, q is the total number of random numbers generated by all the existing processors, t is a natural number, and $1 \leq t \leq$ the number of generated random numbers.

10. A method for generating random numbers in a system that includes a plurality of processors, comprising the steps of:

setting in advance initial values for said processors;

simultaneously generating random numbers with said processors on the basis of the initial values; and arranging the random numbers generated by the processors to produce a sequence of periodically repeated random numbers.

11. A method as defined in claim 10, further comprising the steps of:

adding an additional random number generating processor during generation of the random numbers by said processors;

resetting said initial values for generating random numbers with the plurality of processors and the additional processor; and arranging the random numbers generated by said respective processors to produce, on the basis of the reset initial values, a sequence of periodically repeated random numbers.

12. A method for generating random numbers in a system that includes a plurality of processors, comprising the steps of:

setting in advance initial values for said processors, said initial values being based in part on a number of random numbers to be generated by said processors;

simultaneously generating random numbers with said processors on the basis of the initial values; and arranging the random numbers generated by the processors to produce a sequence of periodically repeated random numbers.

13. A method as defined in claim 12, further comprising the steps of:

adding an additional random number generating processor during generation of the random numbers by said processors;

resetting said initial values for generating random numbers with the plurality of processors and the additional processor; and arranging the random numbers generated by said respective processors to produce, on the basis of the reset initial values, a sequence of periodically repeated random numbers.

14. A method for generating random numbers in a system that includes a plurality of processors, comprising the steps of:

setting initial values for said processors;

storing said initial values in a storing unit;

simultaneously generating random numbers with said processors on the basis of the initial values; and arranging the random numbers generated by the processors to produce a sequence of periodically repeated random numbers which are stored in said storing unit.

15. A method as defined in claim 14, further comprising the steps of:

adding an additional random number generating processor during generation of random numbers by said processors;

resetting said initial values for generating random numbers with the plurality of processors and the additional processor;

storing the reset initial values in said storing unit;

setting the number of random numbers to be generated by each processor on the bases of the total number of random numbers to be generated in the whole multiprocessor system and the number of said processors; and arranging the random numbers generated by said respective processors to produce, on the basis of the reset initial values, a sequence of periodically repeated random numbers.

16. A method as defined in claim 14, further comprising the steps of:

adding an additional random number generating processor during generation of random numbers by said plurality of processors;

controlling each of said plurality of processors so as to generate random numbers up to a number obtained by adding an arbitrary number to the number of random numbers generated by a one of said plurality of processors which has generated the greatest number of random numbers;

resetting an initial value for each of said plurality of processors and said additional processor to generate random numbers on the basis of the number of random numbers already generated by said plurality of processors;

storing the reset initial value for each of said plurality of processors and said additional processor in said storing unit;

setting the number of random numbers to be generated by said additional processor and said plurality of processors on the bases of the total number of random numbers to be generated in the whole multiprocessor system, the number of already generated random numbers, and the total number of said plurality of processors and said additional processor; and arranging the random numbers generated by the respective processors on the basis of said reset initial values and the number of already generated random numbers to produce a sequence of periodically repeated random numbers which are stored in said storing unit.

17. A method for generating random numbers in a system that includes a plurality of processors, comprising the steps of:

setting initial values for said processors and storing said initial values in a storing unit, said initial values being determined by means of an expression:

$$X_n = X * a^n \bmod M,$$

where a, X, and M are integers, $0 \leq X < M$, and n is the number of said plurality of processors;

setting a number of random numbers to be generated by each of said plurality of processors on the bases of the total number of random numbers to be generated in the whole multiprocessor system and the number of said plurality of processors, the number of random numbers to be generated being equal to the total number of random numbers to be generated divided by the number of said plurality of processors, minus one; and arranging the random numbers generated by the respective processors on the basis of said initial values to produce a sequence of random numbers which are stored in said storing units, said sequence of random numbers being produced by means of an expression:

$$X_{n+rt} = a * X_{n+r(t-1)},$$

where X is an integer, a is an initial value, r is the number of processors, n is a processor number, t is a natural number, and $1 \leq t \leq$ the number of generated random numbers.

18. A method as defined in claim 17, further comprising the steps of:

adding an additional random number generator processor during generation of random numbers with said plurality of processors;

controlling each of said plurality of processors so as to generate random numbers up to a number obtained by adding an arbitrary number to the number of random numbers generated by a one of said plurality of processors which has generated the greatest number of random numbers;

resetting an initial value for each of said plurality of processors and said additional processor to generate random numbers on the basis of the number of random numbers already generated by said plurality of processors, said random numbers being generated by means of an expression:

$$X_{q+n} = X_q * a^n \bmod M,$$

where a, X, and M are integers, $0 \leq X < M$, n is a processor number, and q is the total number of random numbers generated by the plurality of processors;

storing said reset initial value for each of said plurality of processors and said additional processor in said storing unit;

setting the number of random numbers to be generated by each processor on the bases of the total number of random numbers to be generated in the whole multiprocessor system, the number of already generated random numbers, and the number of processors for generating random numbers, the number of random numbers to be generated being equal to:

{(the total number of random numbers to be generated minus the number of already generated random numbers) divided by the number of processors} minus one; and arranging random numbers generated by the respective processors on the basis of said reset initial values and the number of already generated random numbers to produce a sequence of random numbers which are stored in said storing unit, said sequence of random numbers being obtained, by means of an expression:

$$X_{n+q+rt} = a^r * X_{n+q+r(t-1)},$$

where X is an integer, a is an initial value, r is the number of processors, n is a processor number, q is the total number of random numbers generated by all the existing processors, t is a natural number, and $1 \leq t \leq$ the number of generated random numbers.

* * * * *